United States Patent
Weber et al.

(10) Patent No.: US 6,326,412 B1
(45) Date of Patent: *Dec. 4, 2001

(54) POLYURETHANE FOAM AND PROCESS FOR PRODUCTION

(75) Inventors: Hans Weber, Duderstadt; Peter Gansen, Seeburg, both of (DE)

(73) Assignee: Otto Bock Schaumsysteme GmbH & Co. KG, Duderstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/706,470

(22) Filed: Nov. 3, 2000

(30) Foreign Application Priority Data

Nov. 3, 1999 (DE) .................................. 199 53 060
Jan. 8, 2000 (DE) .................................. 100 00 495

(51) Int. Cl.$^7$ ........................................... C08J 9/04
(52) U.S. Cl. .................. 521/129; 521/170; 521/172; 521/174
(58) Field of Search .................................. 521/129, 170, 521/172, 174

(56) References Cited

U.S. PATENT DOCUMENTS 5,834,579 * 11/1998 Konig et al. ................... 521/129
6,077,877 * 6/2000 Gerkin et al. ................... 521/174

FOREIGN PATENT DOCUMENTS 0 121 850  10/1984  (EP) .
0 652 250  10/1995  (EP) .

* cited by examiner

Primary Examiner—John M. Cooney, Jr.
(74) Attorney, Agent, or Firm—Husch & Eppenberger, LLC; Robert E. Muir; Kevin M. Kercher

(57) ABSTRACT

The present invention relates to a polyurethane foam and associated production process, in particular a polyurethane integral foam and associated production process, whereby a carbamate or a mixture of carbamates is used simultaneously as propellant and as catalyst, and the carbamate or the carbamates have the general Formula I:

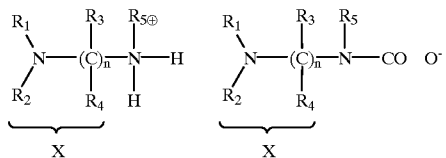

wherein:

$R_1$ and $R_2$ represent the same or different alkyl radicals, $R_3$ and $R_4$ represent the same or different radicals and denote hydrogen or alkyl radicals, $R_5$ denotes hydrogen, an alkanol radical, a polyether monool radical or the radical characterized by X, n represents 2 or 3.

32 Claims, No Drawings

POLYURETHANE FOAM AND PROCESS FOR PRODUCTION

BACKGROUND OF THE INVENTION

The present invention relates generally to a polyurethane foam and an associated process for production, and in particular, a polyurethane integral foam and an associated process for production. Polyurethane foams are conventionally produced by mixing a polyisocyanate component of at least one diisocyanate or polyisocyanate with a polyol component of at least one polyether polyol or polyester polyol, in the presence of at least one catalyst and at least one propellant and optionally in the presence of various auxiliaries and additives well known in polyurethane chemistry. These additives also optionally include foam stabilizers.

The properties of the polyurethane foams may be adjusted within wide ranges by use in conjunction with low molecular diols as chain extenders or with triols and amines as crosslinkers.

A special variant of mold foaming is reaction foam casting, which is also referred to as the Reaction Injection Molding (RIM) process. Flexible to semi-hard moldings are obtained from integral foam, which characteristically has a compact edge zone integrally joined to a light cellular core within a molding made from the same PUR material. Such moldings are used, for example, in the automobile industry as car interior covering, dashboards, steering wheels, and also for spoilers, etc. An equally large and important area of application lies in the shoe industry, where such moldings are used for shoe soles or shoe components. PUR foams are used on a large scale today in numerous other areas.

Mainly carbon dioxide or halogen alkanes are used as propellants. Selection of the propellant depends, inter alia, on the reaction mixture to be foamed and the required strength as well as further properties of the final foamed foam. Besides water, fluorochlorohydrocarbons (FCHC), hydrogen fluorochlorohydrocarbons (HFCHC), hydrogen fluorohydrocarbons (HFHC) or special carbamates in particular, have been used as propellants for the production of harder polyurethane foams. Due to the known ecological problems associated with the said halogen-containing propellants, their use is continuously decreasing in the field of integral foams. However, the use of water as exclusive propellant is not a solution to the problems of propellants, particularly because pressure suppression in the foam proceeds considerably more slowly than when using known halogen-containing propellants. As a result, in series production, although there is conventional short remolding times, moldings result which tend to crack easily and the elasticity of the resulting moldings (in particular for shoe soles) does not satisfy the requirements of practice.

Likewise, the obvious concept of using hydrocarbons, such as isomeric pentanes or cyclopentanes, to solve the problems of propellants is undesirable due to the problem of easy flammability of the substances.

Tertiary amines and tin organic compounds generally serve as catalysts for producing polyurethane foams. Tertiary amines are conventionally used for the above-mentioned integral foam systems. Co-catalysis by metal catalysts is possible. The foams produced with the aid of amine catalysts have various disadvantages. The amine catalysts remain in the foam, but are not firmly bound there. Thus, in the course of time, and particularly after high-temperature aging, a long-lasting constant odor results. The gradual gaseous emission of amines may also be associated with health stresses to the user. Accordingly, it is an urgent need of the car industry to have available polyurethane foams which are free of amine emissions, particularly for car interior covering. Furthermore, the foams produced using amine catalysts have the disadvantage that they lead to discoloration of the PVC, particularly when processing as a laminate with PVC. Known amine catalysts have all the afore-mentioned technical disadvantages. They may lead to an unpleasant odor or to PVC discoloration either because they partly evaporate during the reaction or because the curing of the foam is inadequate.

European patent 0 121 850 indeed already describes the use of certain carbamates which carry hydroxyl groups as propellants for polyurethane foams, preferably in combination with other propellants, as can be seen from the exemplary embodiments. However, European patent 0 121 850 does not convey any indication of the surprising finding that carbamates may also be used as catalysts for the production of polyurethane foams. Due to their particular makeup, known carbamates generally cannot also replace the tertiary amine catalysts.

European granted patent 0 652 250 describes the use of carbamates containing hydroxyl groups as exclusive propellant for integral foams. Here too, it is not a question of the replacement of catalysts. Rather, catalysts are thus used which lead to the above-mentioned undesirable accompanying phenomena, such as odor pollution and PVC discoloration.

The present invention is directed to overcoming one or more of the problems set forth above.

SUMMARY OF THE INVENTION

An aspect of the invention is therefore to provide a process for producing polyurethane foam, in which the use of fluorohydrocarbons and/or chlorohydrocarbons as propellants as well as traditional amine catalysts is unnecessary. The aim is thus to achieve significantly reduced PVC discoloration on high-temperature aging and significantly lower odor emission than for conventional moldings, while yet producing moldings having corresponding strength.

It has now been found, surprisingly, that certain carbamates of the type described below in more detail are catalysts and propellants, which also facilitate the production of polyurethane foams having compact surfaces. The use of additional propellants may thus be rendered unnecessary. Furthermore, traditional amine catalysts are completely replaced. However, use of other catalysts, such as certain metal catalysts, is also possible.

DETAILED DESCRIPTION

The invention provides a process for producing polyurethane foam in the presence of at least one catalyst and at least one propellant, wherein a carbamate or a mixture of carbamates of the general formula hereinafter entitled "Formula I":

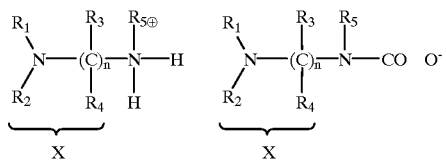

where:

R$_1$ and R$_2$ represent the same or different alkyl radicals,

R$_3$ and R$_4$ represent the same or different radicals and denote hydrogen or alkyl radicals, R$_5$ denotes hydrogen, an alkanol radical, a polyether monool radical or the radical characterized by X, n represents 2 or 3, is used as catalyst and at the same time as propellant with exclusion of other amine catalysts.

The process produces moldings which have significantly reduced PVC discoloration on high-temperature aging and significantly lower odor, compared to moldings produced using conventional catalysts, while having the same strength.

An alkanol radical is understood to mean groups generally known to the chemist under this term, such as a methanol radical, ethanol radical, propanol radical, isopropanol radical, or further alkanol radicals.

"Alkyl radical" is understood to mean all groups falling under the general chemical definition of an alkyl radical, in particular methyl radicals, ethyl radicals, propyl radicals butyl radicals, isopropyl radicals, isobutyl radicals, tertiary butyl radicals, cyclopropyl radicals, cyclopentyl radicals, cyclohexyl radicals, cycloheptyl radicals as well as longer-chain branched or unbranched or cyclic alkyl radicals.

The process is preferably characterized in that the polyurethane foam is produced from a reaction mixture which contains:

a polyisocyanate component having an NCO content of 14 to 33.6 wt. %, consisting of at least one, optionally modified, polyisocyanate or polyisocyanate mixture of the diphenylmethane series (hereinafter A);

a polyol component of an average hydroxyl functionality of 2–3, consisting of at least one polyether polyol or polyester polyol having OH numbers <56, optionally with addition of conventional auxiliaries and additives, as are known from polyurethane chemistry (hereinafter B); and The reaction mixture may also preferably also contain crosslinking and/or chain-extending agents, which consist of at least one difunctional or trifunctional compound having an OH or NH number from 56 to 1,810 in quantities of 1 to 20 wt. % based on the weight of the polyol component (hereinafter C).

The polyisocyanate component "A" is preferably liquid at 20° C. and has an NCO content of 14 to 33.6, preferably of 20 to 30, wt. %. It is at least one, optionally chemically modified, polyisocyanate or polyisocyanate mixture of the diphenylmethane series.

These are understood to mean in particular 4,4'-diisocyanato diphenylmethane, its technical mixtures with 2,4'-diisocyanato diphenylmethane and optionally 2,2'-diisocyanato diphenylmethane, mixtures of these diisocyanates with their higher homologues, which occur in the phosgenation of aniline/formaldehyde condensates and/or are obtained in the working up by distillation of such phosgenation products. The "chemical modification" of these polyisocyanates is in particular the urethane modification known, for example by reacting up to 30 equivalent per cent of the existing NCO groups with polypropylene glycols of a maximum molecular weight of 700 or carbodiimidisation known to be comprised of 30% of the existing NCO groups. Allophanate or biuret modifications of the said isocyanates are also possible according to the invention.

The polyol "B" has an average hydroxyl functionality of 2 to 3 and consists of at least one polyhydroxy polyether of molecular weight 2,000 to 10,000, preferably 3,000 to 6,000 and/or at least one polyhydroxy polyether of molecular weight 2,000 to 10,000, preferably 2,000 to 4,000. These details regarding molecular weight relate to the molecular weight which can be calculated from OH functionality and OH content.

Suitable polyhydroxy polyethers are the alkoxylation products of preferably difunctional or trifunctional starter molecules known from polyurethane chemistry or mixtures of such starter molecules. Suitable starter molecules include water, ethylene glycol, diethylene glycol, propylene glycol, trimethylol propane or glycerol. Propylene oxide and ethylene oxide in particular are the alkylene oxides used for alkoxylation, wherein these alkylene oxides may be used in any sequence and/or as a mixture. Alkoxylation products, which result due to the reaction of a starter with tetrahydrofuran, may likewise be used (PTMEG).

Suitable polyester polyols are the esterification products of preferably dihydric alcohols having hydroxyl groups, such as ethylene glycol, propylene glycol, neopentyl glycol, 1,4-butane diol, 1,6-hexane diol with excess quantities of preferably difunctional carboxylic acids, such as succinic acid, adipic acid, phthalic acid, tetrahydrophthalic acid, hexahydrophthalic acid or mixtures of such acids.

The difunctional or trifunctional chain-extending or crosslinking agents are preferably those in a molecular weight range 62 to 1,999, but preferably 62 to 400. If they are not defined compounds, this detail regarding the molecular weight value likewise relates to the value calculated from OH functionality and OH number.

The preferred chain-extending or crosslinking agents "C" include simple dihydric alcohols of molecular weight below 200, such as ethylene glycol, 1,3-propane diol, 1,4-butane diol, 1,6-hexane diol or mixtures of such simple diols. Diols having ether groups corresponding to the statements made regarding the molecular weight, as are accessible by propoxylation and/or ethoxylation of divalent starter molecules of the type already mentioned, are likewise suitable as chain-extending or crosslinking agents "C" or as part of the chain-extending or crosslinking agents "C".

Aromatic diamines having sterically hindered amino groups, such as 1-methyl-3,5-diethyl-2,4-diaminobenzene and its technical mixtures with 1-methyl-3,5-diethyl-2,6-diaminobenzene (DETDA), are likewise suitable as the chain-extending or crosslinking agents "C".

Furthermore, functional compounds, in particular trifunctional alcohols, such as glycerol, trimethylol propane, hexane 2,2,6-triol, butane 1,2,4-triol, may be used as crosslinking agents "C".

Alkanol amines, such as monoethanolamine, diethanolamine and triethanolamine, diisopropanolamine and others are likewise suitable.

Any mixtures of the chain-extending agents mentioned by way of example may likewise be used.

The chain-extending or crosslinking agents "C" are used in the process of the invention in quantities of 1 to 20, and preferably 4 to 12 wt. %, based on the weight of component "B".

On the one hand the carbamates which are essential to the invention, and on the other hand additives of the type known per se, are used as auxiliaries and additives.

The carbamates which are essential to the invention are compounds of the general formula already mentioned above, wherein the variables R$_1$ to R$_5$ and n have the meaning already mentioned above.

Those carbamates of the following general formula are preferably used:

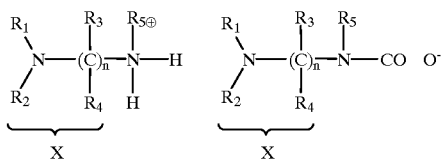

wherein:
$R_5$ denote hydrogen, an alkyl radical or the radicals characterized by X.
$R_1$ and $R_2$ denote methyl radicals.
$R_3$ and $R_4$ denote hydrogen and
n represents 3.

The production of carbamates may be effected by simple saturation of the basic diamines of the formula

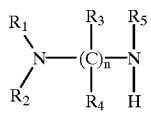

with gaseous or solid carbon dioxide at temperatures between 40 and 130° C., with or without use of a suitable diluent.

3-Dimethylaminopropylamine and bis(3-dimethylaminopropyl)amine are particularly preferred for producing the carbamates, or mixtures of these amines.

When carrying out the process of the invention, the carbamate used as propellant is used in a quantity of less than 8 wt. %, but preferably 0.1 to 6 wt. % or preferably 0.5 to 5 wt. %, based on the weight of component "B".

Further auxiliaries and additives, hereinafter "D", which may be used are those which are conventional in the production of polyurethane foams, such as activators, stabilizers or also other halogen-free propellants, including water, which are used optionally in a quantity of up to 0.5 wt. %, based on the weight of component "B".

However, the process of the invention is preferably carried out using total water quantities of about 0.1 wt. %.

The starting components are moreover used in those quantities which correspond to an isocyanate characteristic of 80 to 120, but preferably 95 to 105.

To carry out the process of the invention, components "B" to "D" are generally combined to form a "polyol component", which is then mixed with the polyisocyanate component "A" and preferably reacted in closed molds. Conventional measuring and metering devices are used for this. Shoe soles or shoe component molds (for producing shoe soles or shoe components by the casting or direct-coating process), steering wheel or spoiler molds or molds for crash padding in a car interior, the inner walls of which are often coated with conventional mold separating agents before filling the mold, are used as mold dies.

Conventional, known casting, injection or other processes are used for producing other foam parts, such as free-foamed blocks.

The temperature of the reaction components (polyisocyanate component "A") or polyol component) generally lies within the temperature range from 20 to 45° C. The temperature of the mold dies generally lies at 20 to 70° C.

The quantity of the foamable material introduced into the mold is measured so that bulk densities of the moldings of 200 to 700 kg/m³ result.

In a further development of the process, at least one further propellant may additionally be used, wherein the propellants already known from polyurethane chemistry are preferably used. Furthermore, at least one further co-catalyst may additionally be used, preferably a metal catalyst, such as dibutyl tin dilaurate or tin dioctoate.

The process may preferably be used for producing foam coverings, steering wheels, spoilers, as well as crash padding in car interiors. In addition, the production of shoe soles or shoe components, in particular by the casting or direct-coating process is possible. The process products of the invention may be designed as soft, hard or semi-hard polyurethane foams. They are preferably semi-hard polyurethane foams having compact surface of Shore A hardness range 20 to 80. In the examples below all percentages relate to weight.

EXAMPLES

Starting Materials
Polyisocyanate 1:
Polyisocyanate mixture containing 28% NCO and having a viscosity of 130 mPa.s, consisting of the same parts by weight (i) of a polyisocyanate containing 24.5% NCO and having a viscosity (25°) of 500 mPa.s, which has been obtained by phosgenation of an aniline/formaldehyde condensate and then reaction of the phosgenation product with polypropylene glycol of OH number 515, and (ii) a polyisocyanate mixture of the diphenylmethane series containing 31.5% NCO and containing 60% diisocyanato diphenylmethane isomers and 40% higher-solid homogenate.
Polyisocyanate 2:
Modified 4,4'MDI containing 30% NCO, which is produced by partial carbodiimidisation of the NCO groups.
Polyol 1:
Polyether triol of OH number 36, produced by propoxylation of trimethylol propane with subsequent ethoxylation of the propoxylation product (PO:EO weight ratio @85:15)
Polyol 2:
Polyether triol of OH number 28, produced by propoxylation of trimethylol propane with subsequent ethoxylation of the propoxylation product (PO:EO weight ratio @85:15) grafted with 20 wt. % styrene/acrylonitrile (weight ratio @40:60).
Carbamate 1:
$CO_2$ is introduced into 400 g of 3-dimethylaminopropylamine in 400 g of ethylene glycol until saturation. The $CO_2$ mass taken up is 156 g and the viscosity 1,500 mPa.s.
Carbamate 2:
$CO_2$ is introduced into 400 g of bis(3-dimethylaminopropyl)amine in 400 g of ethylene glycol until saturation. The $CO_2$ mass taken up is 94 g and the viscosity 672 mPa.s.
Carbamate 3 (not according to the invention):
220 g of $CO_2$ are introduced into 750 g of aminoethanol until saturation, wherein the viscosity of this compound is 22,000 mPa.s. This product is diluted using 750 g of ethylene glycol to form carbamate III.

The odor was determined according to the VDA recommendation 270 variant B-3. The mark 1 therein represents not perceptible and mark 6 intolerable.

PVC discoloration was determined after contact high-temperature aging in accordance with the VW central standard PV 3355. In order to avoid cross-contamination, the samples were stored in each case separately in a 1.5 liter glass vessel in a circulating air oven for 72 hours at 115° C.

EXAMPLE 1

A foamable mixture of the quantity below is introduced into a steering wheel mold, which is conventional for production via a high-pressure machine for producing steering wheels from Krauss Maffei of the RIM Star 12 type with guiding mixing head, so that a bulk density of 500 g/m$^3$ results.

Die temperature 45° C., raw material temperature 30° C., remolding time 2.5 minutes, shot time 5 seconds, discharge capacity 153 g/s, parts by weight (without insert) 699 g, flash 74 g.

The inner walls of the mold are sprayed with a commercially available mold separating agent (Acmosil 36-4536).

| Polyol Component | |
| --- | --- |
| Polyol 1 | 80 parts by weight |
| Polyol 2 | 10 parts by weight |
| Ethylene glycol | 6.05 parts by weight |
| Diethanolamine | 0.45 parts by weight |
| FORMREZ ® UL 28* | 0.013 parts by weight |
| Water | 0.1 parts by weight |
| Carbamate I | 2.0 parts by weight |

*Commercial product of Witco Chemical Company, Inc., a Delaware Corporation located at 112 E. 42nd Street, New York, New York.

| Polyisocyanate Component | |
| --- | --- |
| Polyisocyanate 1 | 26.5 parts by weight |
| Polyisocyanate 2 | 26.5 parts by weight |
| Properties | |
| PVC discoloration | Hardly detectable |
| Hardness (Shore A) | 56 |
| Flow behavior | Good |
| Odor (VDA 270(B3)) | 2.5 |

The steering wheel corresponds visually to the high requirements of a steering wheel.

EXAMPLE 2

A foamable mixture of the quantity below is introduced into a steering wheel mold which is conventional for production via a high-pressure machine which is conventional for producing steering wheels from Krauss Maffei of the RIM Star 12 type with guiding mixing head, so that a bulk density of 500 g/m$^3$ results.

Die temperature 45° C., raw material temperature 30° C., remolding time 2.5 minutes, shot time 5 seconds, discharge capacity 153 g/s, parts by weight (without insert) 625 g, flash 120 g.

The inner walls of the mold are sprayed with a commercially available mold separating agent (Acmosil 36-4536).

| Polyol Component | |
| --- | --- |
| Polyol 1 | 80 parts by weight |
| Polyol 2 | 10 parts by weight |
| Ethylene glycol | 6.05 parts by weight |
| Diethanolamine | 0.45 parts by weight |
| FORMREZ ® UL 28* | 0.013 parts by weight |
| Water | 0.1 parts by weight |
| Carbamate I | 2.0 parts by weight |
| Carbamate III | 0.5 parts by weight |

*Commercial product of Witco Chemical Company, Inc., a Delaware Corporation located at 112 E. 42nd Street, New York, New York.

| Polyisocyanate Component | |
| --- | --- |
| Polyisocyanate 1 | 27.5 parts by weight |
| Polyisocyanate 2 | 27.5 parts by weight |
| Properties | |
| Hardness (Shore A) | 55 |
| PVC discoloration | Hardly detectable |
| Flow behavior | Very good |
| Odor (VDA 270(B3)) | 1.5 |

The steering wheel corresponds visually to the high requirements of a steering wheel.

EXAMPLE 3

A foamable mixture of the quantity below is introduced into a steering wheel mold which is conventional for production via a high-pressure machine for producing steering wheels from Krauss Maffei of the RIM Star 12 type with guiding mixing head, so that a bulk density of 500 g/m$^3$ results.

Die temperature 45° C., raw material temperature 30° C., remolding time 2.5 minutes, shot time 5 seconds, discharge capacity 153 g/s, parts by weight (without insert) 763 g, flash 10 g.

The inner walls of the mold are sprayed with a commercially available mold separating agent (Acmosil 36-4536).

| Polyol Component | |
| --- | --- |
| Polyol 1 | 80 parts by weight |
| Polyol 2 | 10 parts by weight |
| Ethylene glycol | 6.05 parts by weight |
| Diethanolamine | 0.45 parts by weight |
| FORMREZ ® UL 28* | 0.013 parts by weight |
| Water | 0.1 parts by weight |
| Carbamate II | 1.5 parts by weight |
| Carbamate III | 0.5 parts by weight |

*Commercial product of Witco Chemical Company, Inc., a Delaware Corporation located at 112 E. 42nd Street, New York, New York.

| Polyisocyanate Component | |
| --- | --- |
| Polyisocyanate 1 | 27.5 parts by weight |
| Polyisocyanate 2 | 27.5 parts by weight |
| Properties | |
| Hardness (Shore A) | 54 |
| PVC discoloration | Hardly detectable |
| Flow behavior | Good |
| Odor (VDA 270(B3)) | 1.5 |

The steering wheel corresponds visually to the high requirements of a steering wheel.

EXAMPLE 4

A foamable mixture of the quantity below is introduced into a steering wheel mold which is conventional for production via a high-pressure machine for producing steering wheels from Krauss Maffei of the RIM Star 12 type with guiding mixing head, so that a bulk density of 500 g/m$^3$ results.

Die temperature 45° C., raw material temperature 30° C., remolding time 2.5 minutes, shot time 5 seconds, discharge capacity 153 g/s, parts by weight (without insert) 625 g, flash 120 g.

The inner walls of the mold are sprayed with a commercially available mold separating agent (Acmosil 36-4536).

| Polyol Component | |
|---|---|
| Polyol 1 | 80 parts by weight |
| Polyol 2 | 10 parts by weight |
| Ethylene glycol | 6.05 parts by weight |
| Diethanolamine | 0.45 parts by weight |
| FORMREZ ® UL 28* | 0.013 parts by weight |
| Water | 0.1 parts by weight |
| Carbamate I | 2.5 parts by weight |
| Carbamate III | 1.0 parts by weight |

*Commercial product of Witco Chemical Company, Inc., a Delaware Corporation located at 112 E. 42nd Street, New York, New York.

| Polyisocyanate Component | |
|---|---|
| Polyisocyanate 1 | 27.5 parts by weight |
| Polyisocyanate 2 | 27.5 parts by weight |
| Properties | |
| Hardness (Shore A) | 57 |
| PVC discoloration | Hardly detectable |
| Flow behavior | Very good |
| Odor | 2.0 |

The steering wheel corresponds visually to the high requirements of a steering wheel.

COMPARATIVE EXAMPLE 5

A foamable mixture of the quantity below is introduced into a steering wheel mold which is conventional for production via a high-pressure machine for producing steering wheels from Krauss Maffei of the RIM Star 121 type with guiding mixing head, so that a bulk density of 500 g/m³ results.

Die temperature 45° C., raw material temperature 30° C., remolding time 2.5 minutes, shot time 5 seconds, discharge capacity 153 g/s, parts by weight (without insert) 675 g, flash 97 g.

The inner walls of the mold are sprayed with a commercially available mold separating agent (Acmosil 36-4536).

| Polyol Component | |
|---|---|
| Polyol 1 | 80 parts by weight |
| Polyol 2 | 10 parts by weight |
| Ethylene glycol | 6.18 parts by weight |
| Diethanolamine | 0.45 parts by weight |
| FORMREZ ® UL 28² | 0.013 parts by weight |
| Triethylenediamine | 0.07 parts by weight |
| TOYOCAT ® EF³ | 0.2 parts by weight |
| TOYOCAT ® MR³ | 0.4 parts by weight |
| Water | 0.1 parts by weight |
| Carbamate III | 2.0 parts by weight |

²Commercial product of Witco Chemical Company, Inc., a Delaware Corporation located at 112 E. 42nd Street, New York, New York.
³Commercial product of Tosoh Corporation, a Japanese Corporation, located at No. 4560, Oaza-Tonda, Shin-Nanyo-Shi, Yamaguchi-ken, Japan (special tertiary amines)

| Polyisocyanate Component | |
|---|---|
| Polyisocyanate 1 | 27.1 parts by weight |
| Polyisocyanate 2 | 27.1 parts by weight |
| Properties | |
| Hardness (Shore A) | 57 |
| PVC discoloration | Red |
| Flow behavior | Very good |
| Odor (VDA 270(B3)) | 4.0 |

The steering wheel corresponds visually to the high requirements of a steering wheel.

Other objects, features and advantages will be apparent to those skilled in the art. While preferred embodiments of the present invention have been illustrated and described, this has been by way of illustration and the invention should not be limited except as required by the scope of the appended claims.

We claim:

1. A process for producing polyurethane foam in the presence of at least one catalyst and at least one propellant comprising:

wherein a carbamate or a mixture of carbamates of a general formula:

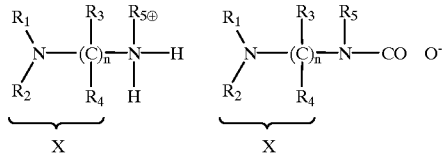

where:
$R_1$ and $R_2$ represent the same or different alkyl radicals,
$R_3$ and $R_4$ represent the same or different radicals and denote hydrogen,
$R_5$ denotes hydrogen,
n represents 2 or 3,
is used as catalyst and propellant, essentially excluding other amine catalysts.

2. The process according to claim 1, wherein $R_3$ and $R_4$ represent the same or different radicals and denote alkyl radicals.

3. The process according to claim 1, wherein $R_5$ denotes an alkanol radical.

4. The process according to claim 1, wherein $R_5$ denotes a polyether monool radical.

5. The process according to claim 1, wherein $R_5$ denotes the radical characterized by X.

6. The process according to claim 1, wherein the polyurethane foam is produced from a reaction mixture which contains:
a polyisocyanate component having an NCO content of 14 to 33.6 wt. %, consisting of at least one polyisocyanate or polyisocyanate mixture of the diphenylmethane series;
a polyol component of an average hydroxyl functionality of 2–3, including at least one polyether polyol or polyester polyol having OH numbers less than 56.

7. The process according to claim 6, wherein the polyol component includes auxiliaries and additives utilized with polyurethanes.

8. The process according to claim 6, wherein the polyisocyanate component is modified.

9. The process according to claim 6, wherein the reaction mixture also contains at least one crosslinking or chain-extending agent of at least one difunctional or trifunctional compound having an OH or NH number of 56 to 1,810 in quantities of 1 to 20 wt. % based on the weight of the polyol component.

10. The process according to claim 1, further includes utilizing at least one additional propellant.

11. The process according to claim 1, further includes at least one additional co-catalyst.

12. The process according to claim 1, wherein said additional co-catalyst is a metal catalyst.

13. The process according to claim 1, wherein the carbamates are used in a quantity of less than 8 wt. % based on a weight of the polyol component.

14. A process according to claim 1, wherein the polyurethane foam is shaped by transforming a reaction mixture in closed molds to form cellular moldings having compact surface.

15. A process according to claim 13, wherein the polyurethane foam is shaped to form foam coverings of steering wheels, spoilers, as well as a car interior crash padding.

16. A process according to claim 1, wherein the polyurethane foam is shaped to form shoe soles or shoe components by the casting or direct-coating process.

17. A polyurethane foam comprising:
the presence of at least one catalyst and at least one propellant, wherein a carbamate or a mixture of carbamates of a general formula:

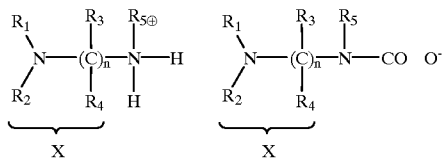

where:
$R_1$ and $R_2$ represent the same or different alkyl radicals,
$R_3$ and $R_4$ represent the same or different radicals and denote hydrogen,
$R_5$ denotes hydrogen,
n represents 2 or 3,
is used as catalyst and propellant, essentially excluding other amine catalysts.

18. The polyurethane foam according to claim 17, wherein $R_3$ and $R_4$ represent the same or different radicals and denote alkyl radicals.

19. The polyurethane foam according to claim 17, wherein $R_5$ denotes an alkanol radical.

20. The polyurethane foam according to claim 17, wherein $R_5$ denotes a polyether monool radical.

21. The polyurethane foam according to claim 17, wherein $R_5$ denotes the radical characterized by X.

22. The polyurethane foam according to claim 17, wherein the polyurethane foam is produced from a reaction mixture which contains:
a polyisocyanate component having an NCO content of 14 to 33.6 wt. %, consisting of at least one polyisocyanate or polyisocyanate mixture of the diphenylmethane series;
a polyol component of an average hydroxyl functionality of 2–3, including at least one polyether polyol or polyester polyol having OH numbers less than 56.

23. The polyurethane foam according to claim 22, wherein the polyol component includes auxiliaries and additives utilized with polyurethanes.

24. The polyurethane foam according to claim 22, wherein the polyisocyanate component is modified.

25. The polyurethane foam according to claim 22, wherein the reaction mixture also contains at least one crosslinking or chain-extending agent of at least one difunctional or trifunctional compound having an OH or NH number of 56 to 1,810 in quantities of 1 to 20 wt. % based on the weight of the polyol component.

26. The polyurethane foam according to claim 17, further includes at least one additional propellant.

27. The polyurethane foam according to claim 17, further includes at least one additional co-catalyst.

28. The polyurethane foam according to claim 17, wherein said additional co-catalyst is a metal catalyst.

29. The polyurethane foam according to claim 17, wherein the carbamates are used in a quantity of less than 8 wt. % based on a weight of the polyol component.

30. A polyurethane foam according to claim 17, wherein the polyurethane foam is shaped by transforming a reaction mixture in closed molds to form cellular moldings having compact surface.

31. A polyurethane foam according to claim 29, wherein the polyurethane foam is shaped to form foam coverings of steering wheels, spoilers, as well as a car interior crash padding.

32. A polyurethane foam according to claim 17, wherein the polyurethane foam is shaped to form shoe soles or shoe components by the casting or direct-coating process.

* * * * *